(12) United States Patent
Bazbaz

(10) Patent No.: US 9,663,284 B2
(45) Date of Patent: May 30, 2017

(54) METHODS OF SEALING PLASTIC BAGS AND PLASTIC BAGS MADE BY THE METHODS

(71) Applicant: Polytex Fibers Corporation, Houston, TX (US)

(72) Inventor: Jacobo Bazbaz, Bellaire, TX (US)

(73) Assignee: Polytex Fibers Corporation, Houston, TX (US)

( * ) Notice: Subject to any disclaimer, the term of this patent is extended or adjusted under 35 U.S.C. 154(b) by 0 days.

(21) Appl. No.: 14/085,094

(22) Filed: Nov. 20, 2013

(65) Prior Publication Data

US 2014/0140642 A1    May 22, 2014

Related U.S. Application Data

(60) Provisional application No. 61/728,334, filed on Nov. 20, 2012.

(51) Int. Cl.
*B65D 33/24* (2006.01)
*B65D 77/10* (2006.01)
(Continued)

(52) U.S. Cl.
CPC ............ *B65D 77/10* (2013.01); *B29C 65/52* (2013.01); *B29C 66/135* (2013.01); *B29C 66/43121* (2013.01); *B29C 66/723* (2013.01); *B29C 66/7292* (2013.01); *B32B 7/12* (2013.01); *B32B 27/08* (2013.01); *B32B 27/32* (2013.01); *B32B 27/34* (2013.01); *B32B 27/36* (2013.01); *B65D 33/18* (2013.01); *B29C 66/71* (2013.01); *B29C 66/73921* (2013.01); *B29L 2031/7128* (2013.01); *B32B 2307/518* (2013.01); *B32B 2307/5825* (2013.01); *B32B 2307/702* (2013.01); *B32B 2439/40* (2013.01);
(Continued)

(58) Field of Classification Search
CPC ...... B65D 31/00; B65D 31/005; B65D 33/22; B65D 77/10; B65D 33/18; B65B 7/08; B65B 51/02; B65B 51/10; B29C 65/52; B29C 66/135; B29C 66/43121; B29C 66/723; B29C 66/7292; B32B 7/12; B32B 27/08; B32B 27/32; B32B 27/34; B32B 27/36
USPC ............. 383/123–126, 109, 116, 117, 84, 85
See application file for complete search history.

(56) References Cited

U.S. PATENT DOCUMENTS 258,925 A * 6/1882 Holmes ......................... 383/126
3,285,498 A * 11/1966 Becker, III .................... 383/123
(Continued)

FOREIGN PATENT DOCUMENTS

| EP | 2599617 | 6/2013 |
|---|---|---|
| WO | 2009082712 | 7/2009 |
| WO | 2015103103 | 7/2015 |

*Primary Examiner* — Jes F Pascua
(74) *Attorney, Agent, or Firm* — Vinson & Elkins LLP

(57) ABSTRACT

Methods of sealing a woven laminated plastic bag are provided that result in no adhesive-to-adhesive contact. In various aspects the bag can be fabricated from woven polypropylene and/or polyethylene layer which can be laminated with a film layer, can form a pinch bottom bag, and can have one or both sides include graphics and/or printing. The bag can also provide a top end and/or a bottom end either or both of which provide a discrete area which may contain discrete graphics and/or printing.

18 Claims, 3 Drawing Sheets

(51) Int. Cl.
    *B65D 33/18*     (2006.01)
    *B29C 65/52*     (2006.01)
    *B29C 65/00*     (2006.01)
    *B32B 7/12*     (2006.01)
    *B32B 27/08*     (2006.01)
    *B32B 27/32*     (2006.01)
    *B32B 27/34*     (2006.01)
    *B32B 27/36*     (2006.01)
    *B65D 30/08*     (2006.01)
    *B65D 30/20*     (2006.01)
    *B29L 31/00*     (2006.01)

(52) U.S. Cl.
    CPC ....... *B32B 2439/46* (2013.01); *B32B 2439/70* (2013.01); *B65D 31/02* (2013.01); *B65D 31/10* (2013.01)

(56) References Cited

U.S. PATENT DOCUMENTS

| | | | |
|---|---|---|---|
| 3,508,701 A * | 4/1970 | Saito et al. | 383/109 |
| 3,990,626 A * | 11/1976 | Goodrich | B65D 31/14 383/44 |
| 4,008,850 A | 2/1977 | Goodrich | |
| 4,373,979 A | 2/1983 | Planeta | |
| 4,480,752 A * | 11/1984 | Jacobs | 383/205 |
| 6,013,018 A | 1/2000 | Bannister | |
| 6,074,095 A | 6/2000 | Bannister | |
| 6,126,316 A | 10/2000 | Bannister | |
| 6,478,465 B1 | 11/2002 | Thrall | |
| 6,635,711 B1 | 10/2003 | Miskovic et al. | |
| 6,800,051 B2 * | 10/2004 | Koehn | B31B 19/60 493/199 |
| 6,979,482 B2 | 12/2005 | Hartzell | |
| 7,090,904 B2 | 8/2006 | Hartzell | |
| 7,311,442 B1 | 12/2007 | Moravek | |
| 7,731,425 B2 * | 6/2010 | Lin et al. | 383/78 |
| 8,227,062 B2 * | 7/2012 | Nowak | B32B 27/02 428/34.1 |
| 8,240,915 B2 | 8/2012 | Sargin | |
| 8,241,193 B2 | 8/2012 | Jansen | |
| 8,443,578 B2 | 5/2013 | Sargin | |
| 8,475,046 B2 | 7/2013 | Jansen | |
| 8,535,209 B2 | 9/2013 | Sargin | |
| 9,073,281 B2 | 7/2015 | Sargin | |
| 9,233,502 B2 | 1/2016 | Sargin | |
| 2003/0139516 A1 * | 7/2003 | Quinn et al. | 524/487 |
| 2003/0152299 A1 * | 8/2003 | Culbertson et al. | 383/206 |
| 2006/0045392 A1 | 3/2006 | Bannister | |
| 2007/0047852 A1 * | 3/2007 | Sharp et al. | 383/106 |
| 2007/0047853 A1 * | 3/2007 | Sharp et al. | 383/106 |
| 2007/0104905 A1 * | 5/2007 | Floyd | B60R 21/235 428/36.1 |
| 2008/0292223 A1 | 11/2008 | Bannister | |
| 2009/0159192 A1 | 6/2009 | Bannister | |
| 2009/0324143 A1 * | 12/2009 | Sharp et al. | 383/109 |
| 2010/0029455 A1 | 2/2010 | Skopek et al. | |
| 2010/0154362 A1 | 6/2010 | Jansen | |
| 2010/0158417 A1 * | 6/2010 | Sharp et al. | 383/94 |
| 2010/0293897 A1 | 11/2010 | Jansen | |
| 2011/0002560 A1 * | 1/2011 | Robles et al. | 383/92 |
| 2011/0082019 A1 * | 4/2011 | Bannister | A45C 3/001 493/269 |
| 2011/0103721 A1 | 5/2011 | Sargin | |
| 2011/0255807 A1 | 10/2011 | Shapiro et al. | |
| 2013/0016926 A1 | 1/2013 | Koehn | |
| 2013/0047555 A1 | 2/2013 | Jansen | |
| 2013/0330028 A1 | 12/2013 | Bannister | |
| 2014/0090339 A1 | 4/2014 | Sargin | |
| 2015/0183194 A1 | 7/2015 | Lehamnn | |

\* cited by examiner

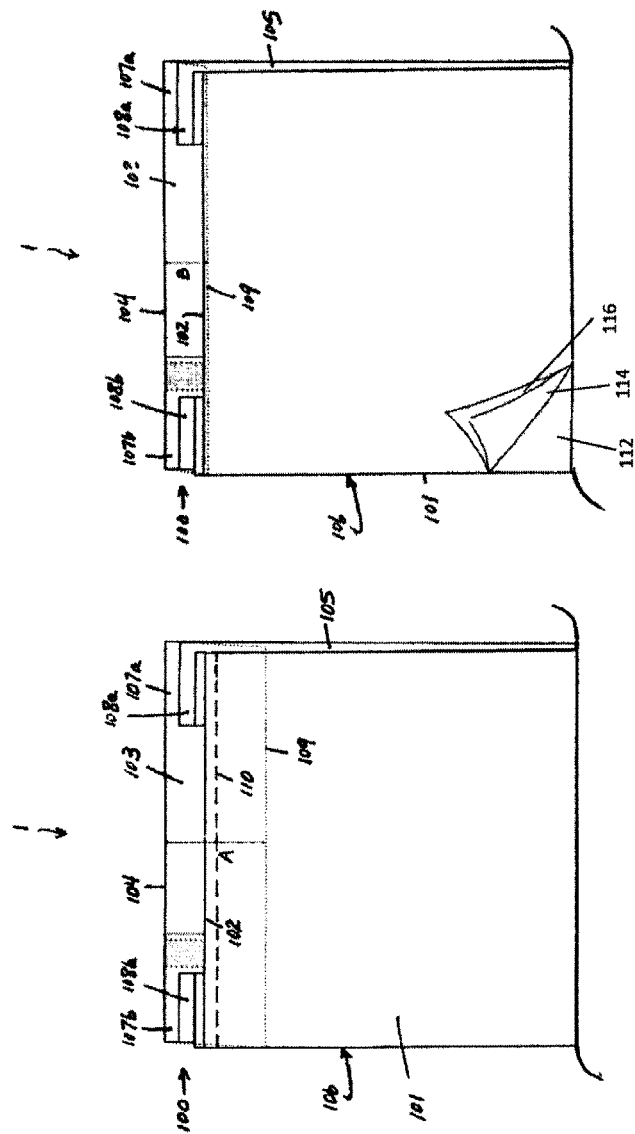

METHODS OF SEALING PLASTIC BAGS AND PLASTIC BAGS MADE BY THE METHODS

CROSS-REFERENCE TO RELATED APPLICATIONS

This application claims the benefit of U.S. Provisional Patent Application Ser. No. 61/728,334, filed on Nov. 20, 2012, which is incorporated herein by reference in its entirety.

STATEMENT REGARDING FEDERALLY SPONSORED RESEARCH OR DEVELOPMENT

N/A

THE NAMES OF PARTIES TO A JOINT RESEARCH AGREEMENT

N/A

INCORPORATION-BY-REFERENCE OF MATERIAL SUBMITTED ON A COMPACT DISC

N/A

BACKGROUND OF THE INVENTION

1. Field of the Invention

The present disclosure relates to improved methods for sealing plastic bags, and in particular plastic bags with pinch ends.

2. Background of the Invention

Conventional plastic bags of a wide variety of size and shape are used in various situations. Bulk materials, such as flour, sugar, rice, seed, animal feed, chemicals, powdered materials or the like, for example, typically have been packaged in woven plastic bags in the past. Pet food, bird seed and other products sold in retail stores typically have not been packaged in conventional woven plastic bags. Among other reasons for this, woven plastic bags were considered too rudimentary to be printed with high end graphics suitable for consumer type of packaging. In addition, the high speed requirements in the filling and packaging operations limited the use of the woven bags in these applications.

Laminated woven sacks (LWS) were developed using a woven polypropylene structure laminated to a bi-oriented polypropylene film (BOPP) that can be reverse printed with high end graphics suitable for consumer type of packaging. The LWS provides a stronger, more attractive bag than the more conventional multiwall bags used for that purpose over the last 20 years. Due to their tough strong structure, conventional LWS bags are typically sewn shut on both ends. These LWS recently met with success and have been successfully substituted for the conventional multiwall paper bags used in the pet food industry for many years.

One major drawback of the sewn LWS has been the closing of the bags at high speed filling lines, such as those for filling such bags with pet food. Experience has shown that sewing production lines are typically slower than the filling of the multiwall pinch bottom bags. Additionally, the sewn bags do not provide an aesthetically pleasing and useful clean display on the ends of the bags, thus making it difficult for consumers to identify or find a desired brand quickly when the bags are displayed on the shelves at the point of sale, such as when they are stacked on top of one another. In addition, the sewn ends required puncturing the plastic bags and thus result in a bag that is not sealed, leading to somewhat reduced shelf-life and possible infestation of the contents of the bag. Other methods for sealing woven and non-woven plastic bags include sealing with a single or double fold at each end with tape over the single or double fold, or a zipper at one end and a single or double fold at the other end. However, these methods also slow down production and/or add cost to the manufacture of the plastic bag. Thus, there is a need for pinch laminated woven sacks that overcome these drawbacks in the filling and closing operations while allowing an attractive graphic display of the end of the bag at the retail outlet and also providing a strong, durable bag that remains sealed.

Woven plastic bags have been used and are conventional for certain applications. An example of a conventional woven plastic bag is provided in U.S. Pat. No. 4,373,979 ("the '979 patent"), issued on Feb. 15, 1983. The '979 patent describes the use of woven strips of highly longitudinally-oriented, high-density polyethylene or polypropylene in a bag construction in which the bag is formed from a seamed tube made of the woven plastic material. The seamed tube has gussets on either side and, when a portion is cut from the rest of the tube, a bag having two open, unsealed ends is provided. The '979 patent describes the use of ultrasonic spot welds to seal portions of a bag made of such woven plastic strips, as opposed to sewing the seams of a bag or using a hot melt adhesive to seal the gusset forming pleat. The '979 patent is hereby incorporated by reference herein. The '979 patent purports to be an improvement for sealing a plastic bag. As noted in the '979 patent, sewing one end tends to take longer, thus adding time to the manufacturing process. In addition, the sewn ends in a conventional bag tend to be a weak portion of the bag, and a likely location for rips, tearing, and subsequent loss of contents during storing, shipping and handling. In addition, such bags may not provide sufficient protection from infestation from vermin and/or insects.

Another example of plastic bags is disclosed in U.S. Patent Application Publication Number U.S. 2010/0029455 A1 ("the '455 publication"), published on Feb. 4, 2010, which describes production of web sections from a flexible web material that is provided with tear-off lines produced by laser beam processing at the distance of the length of the web sections to be formed. The tear-off lines weaken the flexible web material, but do not result in complete separation of the web sections from the web material, which occurs upon tearing the flexible web material. The '455 publication is incorporated by reference herein.

More recently, some types of plastic bags have provided improvements in sealing the ends of the bags. For example, in U.S. Pat. No. 6,800,051 B2 ("the '051 patent"), issued on Oct. 5, 2004, a process for sealing side fold sacks made of plastic film is described. According to the '051 patent, a web of plastic tubular film is cut to provide a staggered detachment along a perforation so that one wall (e.g., the front wall) projects beyond the opposing wall (e.g., the back wall). The projecting portion of the first wall is then folded over and sealed to the opposing wall by means of a plastic adhesive such as a polyurethane adhesive or hot melt. The '051 patent is hereby incorporated by reference herein. However, such bags involve plastic films, not woven plastic materials, and therefore are unable to handle the weight loads of conventional bulk bags made of paper and other materials. Such bags are useful for only certain lightweight contents, such as bread.

There are a variety of conventional ways of providing for reusable openings in bags. For example, U.S. Pat. No. 6,478,465 B1 ("the '465 patent"), issued Nov. 12, 2002, describes a peelable opening in a multiwall, pinched bottom open mouth bag construction. The '465 patent also describes the use of an adhesive layer that can be used so that the bag opening is reclosable. The '465 patent is hereby incorporated by reference herein.

Therefore, what is needed are improved methods for sealing woven and non-woven plastic bags that do not add much to the cost or time to manufacture, and are not susceptible to inadvertent tearing, punctures, breaking, or the like.

SUMMARY OF THE INVENTION

The present disclosure provides improved methods for sealing woven and non-woven plastic bags, which makes the presently disclosed woven and non-woven plastic bags faster and less expensive to produce than conventional woven and non-woven plastic bags.

The present disclosure provides methods of sealing a plastic bag having a front wall, a back wall, a first side wall, a second side wall, a first end, a second end, a first layer and a second layer, the front wall, back wall, first side wall and second side wall having an interior surface, an exterior surface, a first end and a second end, wherein the first end of the bag has a fold line on the exterior surface of the front wall proximal the first end of the front wall, wherein the first layer comprises a woven polymer and the second layer comprises a film laminated to the first layer, and wherein the first end of the back wall projects further than the first end of the first side wall and the first end of the second side wall, and the first end of the first side wall and the first end of the second side wall project further than the first end of the front wall, comprising applying an adhesive to the bag that extends from the interior surface of the first end of the back wall to the fold line, and folding the plastic bag at the fold line such that the interior surface of the top end of the back wall contacts at least a portion of the exterior surface of the front wall, wherein no adhesive-to-adhesive contact is formed upon sealing the plastic bag. In certain embodiments the fold line is about ¼ of an inch below the first end of the front wall.

In some embodiments the first layer comprises polypropylene, high density polyethylene, low density polyethylene, polyester, or any combination thereof. In other embodiments at least a portion of the second layer comprises a printed area thereon. In further embodiments the second layer comprises polypropylene, polyethylene, polyethylene terephthalate, polyamide, or any combination thereof. In yet further embodiments the second layer comprises oriented polypropylene, biaxially-oriented polypropylene, oriented polyethylene, biaxially-oriented polyethylene, oriented polyethylene terephthalate, biaxially-oriented polyethylene terephthalate, oriented polyamide, biaxially-oriented polyamide, or any combination thereof. In particular embodiments the first layer and second layer are laminated together.

In certain embodiments the adhesive is an amorphous polyalphaolefin. In additional embodiments the top end and the bottom end of the bag are sealed, and wherein the bag comprises at least ten pounds by weight of a filling material. In other embodiments the bag further comprises a third layer comprising a polymer between the first layer and the second layer. In yet other embodiments the third layer comprises a woven polymer, including, but not limited to, polypropylene, high density polyethylene, low density polyethylene, polyester, or any combination thereof. In yet other embodiments the third layer comprises a polymeric film including, but not limited to, polypropylene, polyethylene, polyethylene terephthalate, polyamide, or any combination thereof.

The present disclosure also provides plastic bags comprising a front wall, a back wall, a first side wall, a second side wall, an interior surface, an exterior surface, a top end, a bottom end, a first layer and a second layer, the front wall, back wall, first side wall and second side wall having an interior surface, an exterior surface, a top end and a bottom end, wherein the first layer comprises a woven polymer and the second layer comprises a polymer film laminated to the first layer, and wherein the top end of the bag is sealed by a process comprising applying an adhesive to the bag that extends from the interior surface of the first end of the back wall to the fold line, and folding the plastic bag at the fold line such that the interior surface of the top end of the back wall contacts at least a portion of the exterior surface of the front wall, wherein no adhesive-to-adhesive contact is formed upon sealing the plastic bag.

In certain embodiments the first layer comprises polypropylene, high density polyethylene, low density polyethylene, polyester, or any combination thereof. In further embodiments at least portions of the exterior surfaces of each of the front wall and the back wall comprise a plurality of discrete areas further comprising printing thereon. In other embodiments a portion of the front wall and a portion of the back wall combine to form a discrete portion of the bag located at or near either the top end or the bottom end, wherein the discrete portion of the bag comprises printing thereon.

These and other objects of the invention will be apparent to those skilled in the art from the following detailed description.

BRIEF DESCRIPTION OF THE DRAWINGS

The following drawings are included to further demonstrate certain aspects and embodiments of the present invention. The invention may be better understood by reference to one or more of these drawings in combination with the detailed description of specific embodiments presented herein.

FIG. 1 shows a pinch cut bag with the prior art adhesive application pattern.

FIG. 2 shows a pinch cut bag with the presently described adhesive application pattern in accordance with one embodiment of the present invention.

DETAILED DESCRIPTION OF THE PREFERRED EMBODIMENT

Figure 3:
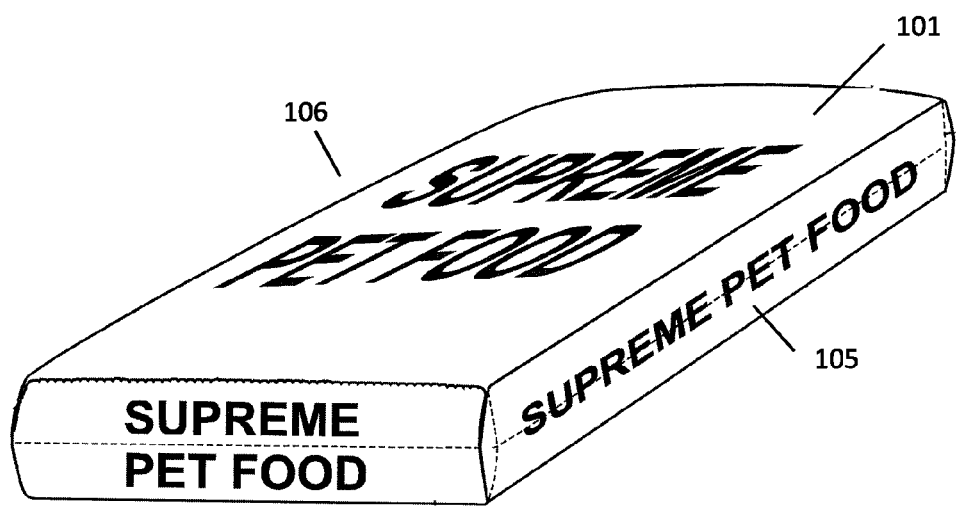
FIG. 3 shows a filled pinch cut bag made in accordance with the present disclosure and with the first end and the second end sealed.

Referring first to FIG. 1, the front side view of the top portion of a "pinch cut" bag 1 is shown with the prior art adhesive application pattern. As shown in FIG. 1, the bag 1 has a first or top end 100 and a bottom end that is not visible in FIG. 1. It will be apparent, however, that the orientation of the bag ends is unimportant and the "top" and "bottom" references are useful but may change depending on the orientation one views the bag. The bag 1 has a front wall 101 with top end 102, a rear wall 103 with top end 104, and two side walls 105 and 106. Bag 1 is considered a "pinch cut" bag because the front wall 101 and the back wall 103 are cut so that one of the ends of the front wall 101 or the back wall 103 is longer than the other; they have different lengths. In the embodiment shown in FIG. 1 the top end 104 of the back wall 103 at the top end 100 of the bag 100 is cut longer than the top end 102 of the front wall 101. Either one or both of the ends of the bag 1 can have a "pinch cut." Those skilled in the art will appreciate that conventional techniques can be used to provide side gussets in the bag 1 for each of sides 105 and 106 during this forming process. The first end 100 of bag 1 has portions 107a and 107b of the rear wall 103 of the bag that extend further from the body of the bag 1 than do portions 108a and 108b of the material of bag 100a forming the side gussets for sides 102 and 103. In addition, the portions 108a and 108b of the side gussets extend further from the body of the bag 1 than the top end 102 of the front wall 101 of the bag 1. As shown in FIG. 1, the prior art adhesive application pattern is represented by the double headed arrow marked "A," and extends from the top end 104 of the rear wall 103 to the adhesive stop line 109. To seal the top end 100 of the bag 1, the top end 100 of the bag 1 is folded at fold line 110 such that that the top end 104 of the rear wall 103 meets the adhesive stop line 109. This leads to an adhesive-to-adhesive seal at the top end 100 of the bag 1.

Referring now to FIG. 2, the front side view of the top portion of a "pinch cut" bag 1 is shown with the presently described adhesive application pattern. As shown in FIG. 2, once again the bag 1 has a first or top end 100 and a bottom end that is not visible in FIG. 2. It will be once again be apparent, however, that the orientation of the bag ends is unimportant and the "top" and "bottom" references are useful but may change depending on the orientation one views the bag. The bag 1 has a front wall 101 with top end 102, a rear wall 103 with top end 104, and two side walls 105 and 106. Bag 1 is considered a "pinch cut" bag because the front wall 101 and the back wall 103 are cut so that one of the ends of the front wall 101 or the back wall 103 is longer than the other; they have different lengths. In the embodiment shown in FIG. 2 the top end 104 of the back wall 103 at the top end 100 of the bag 100 is cut longer than the top end 102 of the front wall 101. Either one or both of the ends of the bag 1 can have a "pinch cut." Those skilled in the art will appreciate that conventional techniques can be used to provide side gussets in the bag 1 for each of sides 105 and 106 during this forming process. The first end 100 of bag 1 has portions 107a and 107b of the rear wall 103 of the bag that extend further from the body of the bag 1 than do portions 108a and 108b of the material of bag 100a forming the side gussets for sides 102 and 103. In addition, the portions 108a and 108b of the side gussets extend further from the body of the bag 1 than the top end 102 of the front wall 101 of the bag 1. As shown in FIG. 2, the presently described adhesive application pattern is represented by the double headed arrow marked "B," and extends from the top end 104 of the rear wall 103 to the adhesive stop line 109. As is readily apparent, the amount of adhesive used in the present adhesive application pattern is greatly reduced compared to the prior art pattern (FIG. 1). As shown in FIG. 2, to seal the top end 100 of the bag 1, the top end 100 of the bag 1 is folded at the adhesive stop line 109 such that that the top end 104 of the rear wall 103 meets the adhesive stop line 109. This leads to an adhesive-to-plastic seal at the top end 100 of the bag 1, compared to the adhesive-to-adhesive seal at the top end 100 of the bag 1 shown in FIG. 1. In addition, since less of the bag is used during sealing in the presently described sealing process, the bag sealed using the presently described process is able to hold a greater volume of product when compared to bags sealed using the prior art process (FIG. 1). As further shown in FIG. 2, the bag walls can include 3 layers, including a first, inner layer 112, a second, outer layer 116 and an optional third layer 114, which can be a polymer, selected from, but not limited to a woven polymer such as polypropylene, high density polyethylene, low density polyethylene, polyester, or any combination thereof, or a polymeric film selected from but not limited to polypropylene, polyethylene, polyethylene terephthalate, polyamide, or any combination thereof.

An example of a bag made by the claimed method is shown in FIG. 3. In this example a first end is sealed and the bag is filled with contents. As described herein, the layered bags made by the claimed methods can be designed to hold ten pounds or more of dry contents such as pet food, for example. The design of the bag also allows printing in discrete areas such as the front wall, back wall (not shown), side gussets, and the first and second ends, again as shown in FIG. 3.

Those skilled in the art will understand and appreciate that the bag according to the invention may vary in size, dimensions, and shape without departing from the scope of the invention, and that the foregoing description of the preferred embodiments is not intended to limit the scope of the invention as defined by the claims. For example, those skilled in the art will understand and appreciate that the bag 1 may be provided with a re-usable opening (not shown) or a corner portion adapted to allow a person to easily pour the contents of the bag 1 out (not shown), or a combination of these two features. Such features are conventional with prior art bags. Similarly, those skilled in the art will appreciate that terms such as "front" and "rear," and "top" and "bottom," are useful in describing a bag, but essentially depend on a bag's orientation when such terms are used, and are therefore not limiting as to a bag's orientation.

Figure 4:
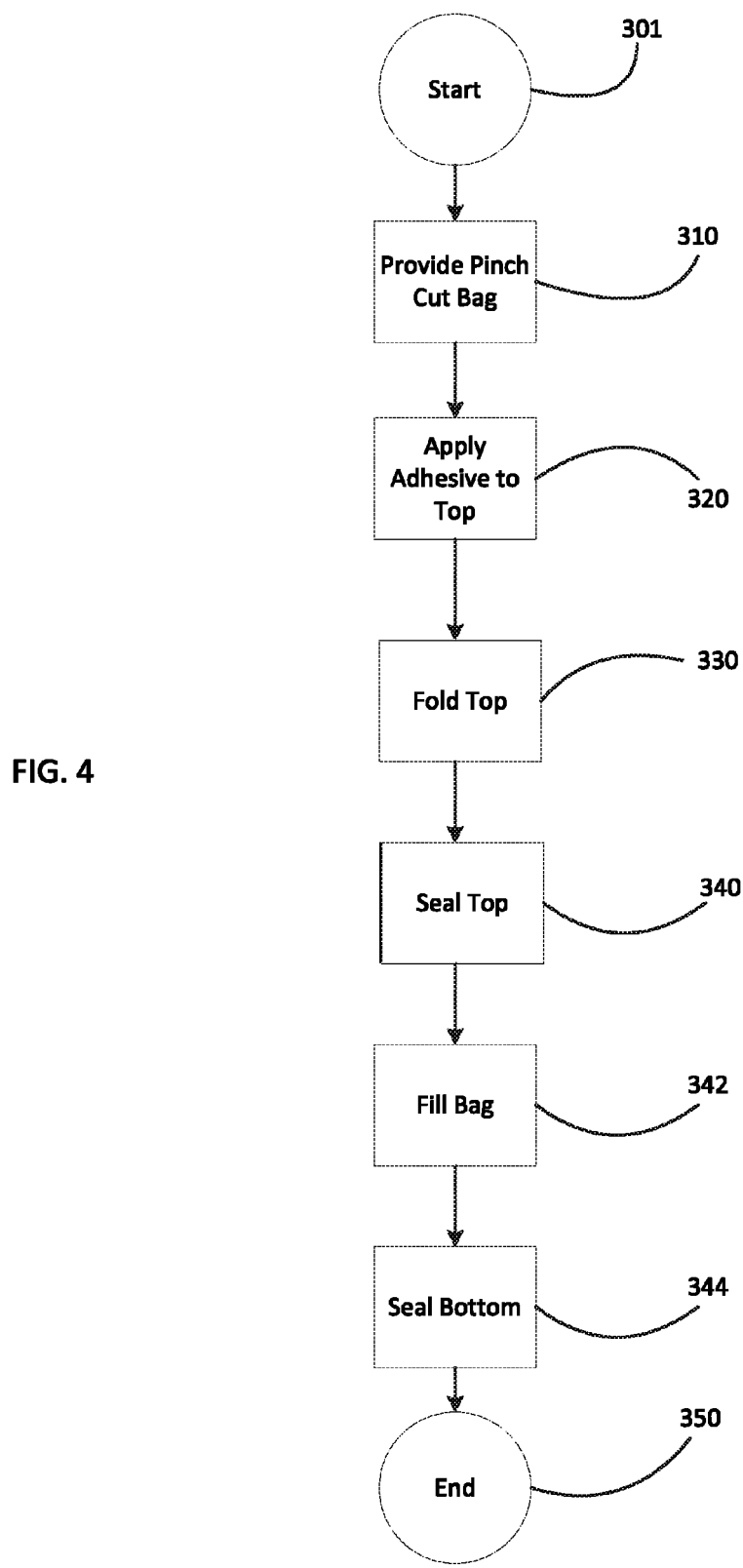
FIG. 4 is a flow diagram illustrating steps in accordance with a method of making a pinch cut bag in accordance with the present disclosure.

Referring now to FIG. 4, a flow diagram of the steps of a method in accordance with an embodiment of the present disclosure is provided. At step 301, the process starts. At step 310, a pinch cut bag, such as bag 1 (shown in FIG. 2 and described above), is provided. At step 320, an adhesive is applied to a portion of the bag, such as is shown in FIG. 2 and described above. As noted above, the adhesive may be applied in a pattern by the arrow marked "B" in FIG. 2, and may extend from the top end 104 of the rear wall 103 to an adhesive stop line 109. At step 330, the top of the bag is folded, as is described above, such that the top end 100 of the bag is folded at the adhesive stop line 109 so that the top end 104 of the rear wall 103 meets the adhesive stop line 109. At step 340, the rear wall 103 is sealed to the front wall with and adhesive-to-plastic seal at the top end 100 of the bag. At step 342, the bag is filled with a filling material, and at step 344, the bottom of the bag is sealed. At step 350, the process concludes.

I claim:

1. A method of sealing a plastic bag having a first end and a second end, comprising:
   a. providing a plastic bag having a first end and a second end, and having a front wall, a back wall, a first side wall, and a second side wall, each wall comprising a laminate consisting essentially of polyethylene and comprising a first layer and a second layer, wherein the first layer consists essentially of woven polyethylene strips and the second layer consists essentially of an oriented polyethylene film, wherein the first layer and second layer are laminated together, wherein the front wall, back wall, first side wall and second side wall each have an interior surface, an exterior surface, a first end and a second end, and wherein the first end of the back wall projects further than the first end of the first side wall, the first end of first side wall projects further than the first end of the second side wall, and the first end of the second side wall projects further than the first end of the front wall;

b. applying an adhesive to (i) the interior surface of the first end of the back wall that projects further than the first end of the front wall and is not covered by the first side wall or the second side wall, (ii) the exterior surface of the first end of the first side wall that projects further than the first end of the second side wall, (iii) the interior surface of the first end of the second side wall that projects further than the first end of the front wall, and (iv) the exterior surface of the front wall located between an adhesive stop line and the first end of the front wall, wherein the adhesive stop line defines a fold line on the exterior surface of the front wall proximal the first end of the front wall; and c. folding the first end of the plastic bag at the fold line such that the interior surface of the first end of the back wall contacts at least a portion of the exterior surface of the front wall and forms an adhesive-to-plastic seal, wherein no adhesive-to-adhesive contact is formed upon sealing the first end of the plastic bag, and wherein the plastic bag is adapted to hold at least ten pounds of a filling material when the bag is sealed at the first end and the second end.

2. The method according to claim 1 wherein the adhesive comprises an amorphous polyalphaolefin.

3. The method according to claim 1 wherein the polyethylene strips of the first layer further comprise high density polyethylene.

4. A bag made in accordance with the process of claim 1.

5. A method of sealing a plastic bag having a first end and a second end, comprising:

a. providing a plastic bag having a first end and a second end, and having a front wall, a back wall, a first side wall, and a second side wall, each wall comprising a laminate consisting essentially of a first layer, a second layer, and a third layer, wherein the first layer consists essentially of woven polyethylene strips, the second layer consists essentially of a polyethylene film, and the third layer consists essentially of a polyethylene film and is located between the first layer and the second layer, wherein the first layer and second layer are laminated together, wherein the front wall, back wall, first side wall and second side wall each have an interior surface, an exterior surface, a first end and a second end, and wherein the first end of the back wall projects further than the first end of the first side wall, the first end of first side wall projects further than the first end of the second side wall, and the first end of the second side wall projects further than the first end of the front wall;

b. applying an adhesive to (i) the interior surface of the first end of the back wall that projects further than the first end of the front wall and is not covered by the first side wall or the second side wall, (ii) the exterior surface of the first end of the first side wall that projects further than the first end of the second side wall, (iii) the interior surface of the first end of the second side wall that projects further than the first end of the front wall, and (iv) the exterior surface of the front wall located between an adhesive stop line and the first end of the front wall, wherein the adhesive stop line defines a fold line on the exterior surface of the front wall proximal the first end of the front wall; and c. folding the first end of the plastic bag at the fold line such that the interior surface of the first end of the back wall contacts at least a portion of the exterior surface of the front wall and forms an adhesive-to-plastic seal, wherein no adhesive-to-adhesive contact is formed upon sealing the first end of the plastic bag, and wherein the plastic bag is adapted to hold at least ten pounds of a filling material when the bag is sealed at the first end and the second end.

6. The method according to claim 5 wherein the adhesive comprises an amorphous polyalphaolefin.

7. The method according to claim 5 wherein the polyethylene strips further comprise high density polyethylene.

8. The method according to claim 7 wherein the polyethylene film of the second layer further consists essentially of an oriented polyethylene film.

9. A bag made in accordance with the process of claim 5.

10. A method of sealing a plastic bag having a first end and a second end, comprising:

a. providing a plastic bag having a first end and a second end, and having a front wall, a back wall, a first side wall, and a second side wall, each wall comprising a laminate consisting essentially of a first layer, a second layer, and a third layer, wherein the first layer consists essentially of woven strips consisting essentially of oriented polypropylene, the second layer consists essentially of an oriented polypropylene film, and the third layer consists essentially of an oriented polypropylene film and is located between the first and the second layer, and the first layer and second layer are laminated together, wherein the front wall, back wall, first side wall and second side wall each have an interior surface, an exterior surface, a first end and a second end, and wherein the first end of the back wall projects further than the first end of the first side wall, the first end of first side wall projects further than the first end of the second side wall, and the first end of the second side wall projects further than the first end of the front wall;

b. applying an amorphous polyalphaolefin adhesive to (i) the interior surface of the first end of the back wall that projects further than the first end of the front wall and is not covered by the first side wall or the second side wall, (ii) the exterior surface of the first end of the first side wall that projects further than the first end of the second side wall, (iii) the interior surface of the first end of the second side wall that projects further than the first end of the front wall, and (iv) the exterior surface of the front wall located between an adhesive stop line and the first end of the front wall, wherein the adhesive stop line defines a fold line on the exterior surface of the front wall proximal the first end of the front wall; and c. folding the first end of the plastic bag at the fold line such that the interior surface of the first end of the back wall contacts at least a portion of the exterior surface of the front wall and forms an adhesive-to-plastic seal, wherein no adhesive-to-adhesive contact is formed upon sealing the first end of the plastic bag, and wherein the plastic bag is capable of holding a greater volume of a filling material and uses less adhesive than if the adhesive had been applied to the exterior surface of the front wall from the first end of the front wall to an adhesive stop line which is further from the first end of the front wall than the fold line and had formed an adhesive-to-adhesive contact, and wherein the plastic bag is adapted to hold at least ten pounds of a filling material when the bag is sealed at the first end and the second end.

11. The method according to claim 10, wherein at least a portion of the second layer comprises a printed area thereon.

12. The method according to claim 10, wherein the second layer further consists essentially of biaxially-oriented polypropylene.

13. The method according to claim 10, further comprising the steps of filling the plastic bag with at least ten pounds by weight of a filling material and sealing the second end of the plastic bag.

14. A bag made in accordance with the process of claim 10.

15. A method of sealing a plastic bag, comprising:
a. providing a bag having a first end and a second end, and having a front wall, a back wall, a first side wall, and a second side wall, each wall consisting essentially of a first layer, a second layer, and a third layer, wherein the first layer consists essentially of woven polymer strips which consist essentially of oriented polypropylene, the second layer consists essentially of an oriented polypropylene film, and the third layer is between the first layer and the second layer and consists essentially of an oriented polypropylene film, and wherein the first layer and second layer are laminated together, wherein the front wall, back wall, first side wall and second side wall each have an interior surface, an exterior surface, a first end and a second end, and wherein the first end of the back wall projects further than the first end of the first side wall, the first end of first side wall projects further than the first end of the second side wall, and the first end of the second side wall projects further than the first end of the front wall;
b. applying an adhesive to the interior surface of the first end of the back wall that projects further than the first end of the front wall and is not covered by the first side wall or the second side wall;
c. applying an adhesive to the exterior surface of the first end of the first side wall that projects further than the first end of the second side wall;
d. applying an adhesive to the interior surface of the first end of the second side wall that projects further than the first end of the front wall;
e. applying an adhesive to the exterior surface of the front wall located between an adhesive stop line and the first end of the front wall, wherein the adhesive stop line defines a fold line on the exterior surface of the front wall and the adhesive stop line is approximately one-fourth of an inch below the first end of the front wall; and
f. folding the first end of the plastic bag at the fold line such that the interior surface of the first end of the back wall contacts at least a portion of the exterior surface of the front wall and forms an adhesive-to-plastic seal, wherein no adhesive-to-adhesive contact is formed upon sealing the first end of the plastic bag, and wherein the plastic bag is capable of holding a greater volume of a filling material and uses less adhesive than if the adhesive had been applied to the exterior surface of the front wall from the first end of the front wall to an adhesive stop line which is further from the first end of the front wall than the fold line and had formed an adhesive-to-adhesive contact, and wherein the plastic bag is adapted to hold at least ten pounds of a filling material when the bag is sealed at the first end and the second end.

16. The method according to claim 15, wherein the adhesive is an amorphous polyalphaolefin.

17. The method according to claim 15, further comprising the steps of filling the plastic bag with at least ten pounds by weight of a filling material and sealing the second end of the plastic bag.

18. A bag made in accordance with the process of claim 15.

* * * * *